(12) United States Patent
Zhang et al.

(10) Patent No.: US 12,442,402 B2
(45) Date of Patent: Oct. 14, 2025

(54) FITTING DEVICE

(71) Applicant: SUZHOU CHINA STAR OPTOELECTRONICS TECHNOLOGY CO., LTD., Suzhou (CN)

(72) Inventors: Shuai Zhang, Jiangsu (CN); Feng Gao, Jiangsu (CN); Wenbing Zhang, Jiangsu (CN)

(73) Assignee: SUZHOU CHINA STAR OPTOELECTRONICS TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/623,580

(22) PCT Filed: Dec. 16, 2021

(86) PCT No.: PCT/CN2021/138757
§ 371 (c)(1),
(2) Date: Jun. 15, 2023

(87) PCT Pub. No.: WO2023/103002
PCT Pub. Date: Jun. 15, 2023

(65) Prior Publication Data
US 2024/0044351 A1 Feb. 8, 2024

(30) Foreign Application Priority Data
Dec. 10, 2021 (CN) .......................... 202111505510.0

(51) Int. Cl.
*B32B 41/00* (2006.01)
*F16B 4/00* (2006.01)
*F16B 11/00* (2006.01)

(52) U.S. Cl.
CPC ............ *F16B 11/002* (2013.01); *F16B 4/004* (2013.01)

(58) Field of Classification Search
CPC ...... F16B 11/002; F16B 4/004; G06F 1/1637; G06F 1/1652; G09F 9/301
(Continued)

(56) References Cited

U.S. PATENT DOCUMENTS

| 2020/0379507 A1 | 12/2020 | Jan et al. |
| 2021/0096601 A1 | 4/2021 | Chen et al. |
| 2022/0227112 A1* | 7/2022 | Zhang .................. B32B 37/003 |

FOREIGN PATENT DOCUMENTS

| CN | 205845984 U | 12/2016 |
| CN | 107591091 A | 1/2018 |

(Continued)

OTHER PUBLICATIONS

International Search Report in International application No. PCT/CN2021/138757, mailed on Sep. 6, 2022.
(Continued)

*Primary Examiner* — Michael N Orlando
*Assistant Examiner* — Joshel Rivera
(74) *Attorney, Agent, or Firm* — PV IP PC; Wei Te Chung

(57) ABSTRACT

A fitting device is provided. The fitting device of the present invention is used for fitting a flexible member to be fitted and a curved accommodating member, and includes a base; a fitting body connected to the base slidably; and at least two return devices, where one end of each of the return devices is connected to the fitting body, and the other end is connected to the base.

9 Claims, 8 Drawing Sheets

(58) Field of Classification Search
USPC .................. 156/60, 64, 350, 351, 378, 379
See application file for complete search history.

(56) References Cited

FOREIGN PATENT DOCUMENTS

| CN | 110861290 A | 3/2020 |
|---|---|---|
| CN | 111102789 A | 5/2020 |
| CN | 111210728 A | 5/2020 |
| CN | 111284110 A | 6/2020 |
| CN | 111497411 A | 8/2020 |
| CN | 111554191 A | 8/2020 |
| CN | 211278319 U | 8/2020 |
| CN | 111640371 A | 9/2020 |
| CN | 111667773 A | 9/2020 |
| CN | 111862797 A | 10/2020 |
| CN | 112248607 A | 1/2021 |
| CN | 112606525 A | 4/2021 |
| CN | 112606526 A | 4/2021 |
| CN | 112863357 A | 5/2021 |
| CN | 112937060 A | 6/2021 |
| CN | 113066374 A | 7/2021 |
| CN | 214068251 U | 8/2021 |
| CN | 214152280 U | 9/2021 |
| JP | 2007112463 A | 5/2007 |
| KR | 20140127091 A | 11/2014 |
| WO | 2021190054 A1 | 9/2021 |
| WO | 2021218458 A1 | 11/2021 |

OTHER PUBLICATIONS

Written Opinion of the International Search Authority in International application No. PCT/CN2021/138757, mailed on Sep. 6, 2022.
Chinese Office Action issued in corresponding Chinese Patent Application No. 202111505510.0 dated Jun. 30, 2022, pp. 1-8.
Notification to Grant Patent Right for Invention issued in corresponding Chinese Patent Application No. 202111505510.0 dated Jul. 26, 2022, pp. 1-5.

* cited by examiner

FITTING DEVICE

FIELD OF INVENTION

This application relates to the field of a display technology, and specifically relates to a fitting device.

BACKGROUND OF INVENTION

Curved display devices are one of the development trends of display devices in the future. An organic light emitting diode (OLED) screen has good flexibility and is widely used in curved display devices. With the development of technology, most of the curved display devices in recent years adopt a scheme of providing curved surfaces on two sides or providing curved surfaces on four sides.

A curved display device usually uses a 3D fitting process, that is, a flexible pressing block is used to fit a flexible display panel with an Optically Clear Adhesive (OCA) to a curved cover plate. As shown in FIG. 1, in an existing fitting device 100', a flexible pressing block 200' is fixed on a base platform 300', the base platform 300' is fixed on a lower base 400', the lower base 400' is fixed on a lower cavity 500', a curved cover plate 600' is fixed on an upper base 700', and the upper base 700' is fixed on an upper cavity 800'. A CCD alignment camera is usually used to take pictures to align the positions of a flexible display panel 900' and the curved cover plate 600'.

When poor alignment occurs and different products are fitted, the installation positions of the lower base 400' and the upper base 700' cannot be corrected in time, repeated debugging is required, which is time-consuming and laborious, and the alignment accuracy is still lower. The flexible pressing block 200' is easy to deform; a guiding film 1000' is easy to cause a deformation of the flexible pressing block 200' under the guiding film; after the flexible display panel 900' is pre-bent on the flexible pressing block 200', the flexible pressing block 200' easily generates a larger deformation, and thus, the arc of the curved cover plate 600' cannot be fully filled. Moreover, there are positioning errors and installation errors among the components of the fitting device 100; and the flexible pressing block 200' is softer and has greater friction, so that a gap 1100' needs to be formed in a clamping joint between the flexible pressing block 200' and the base platform 300', so as to facilitate the installation of the flexible pressing block 200' on the base platform 300' under the flexible pressing block. As a result, the central axis of the flexible pressing block 200' of the fitting device 100' does not coincide with the central axis of the curved cover plate 600' (as shown in FIG. 2, FIG. 3 and FIG. 4), resulting in uneven fitting pressure. Excessive pressure will cause breakage, too small pressure will cause insufficient fitting, bad phenomena such as bubbles and dark spots occur, and thus, the fitting yield is affected.

SUMMARY OF INVENTION

An objective of the present invention is to provide a fitting device which can solve the problems in an existing fitting device that the position of a flexible pressing block cannot be adjusted in time, the flexible pressing block is prone to deformation, resulting in insufficient fitting, and the alignment accuracy is low, resulting in uneven fitting, breakage, bubbles, dark spots, etc.

In order to solve the above problems, the present invention provides a fitting device for fitting a flexible member to be fitted and a curved accommodating member. The fitting device includes: a base; a fitting body connected to the base slidably; and at least two return devices, where one end of each of the return devices is connected to the fitting body, and the other end is connected to the base.

Further, each of the return devices includes an elastic element.

Further, each of the return devices further includes an adjusting element, and the adjusting element is connected to the elastic element.

Further, the fitting body includes: a support assembly connected to the base slidably; and a bearing platform connected to one end of the support assembly away from the base.

Further, the cross-sectional shape of the bearing platform is a rounded trapezoid, and the length of a bottom edge of the rounded trapezoid on one side close to the base is smaller than the length of a bottom edge on one side away from the base.

Further, the support assembly includes: a support shaft; two first support rods parallel to each other and connected to two ends of the support shaft rotationably; and two second support rods parallel to each other, connected to two ends of the support shaft rotationably, and crossed with the first support rods.

Further, the first support rod and the second support rod located at the same end of the support shaft are symmetrical to each other.

Further, the fitting body further includes: two fitting shafts parallel to each other and connected between the two first support rods and between the two second support rods respectively.

Further, the fitting shafts are parallel to the support shaft.

Further, the flexible member to be fitted is a flexible display panel, and the curved accommodating member is a curved cover plate.

Beneficial Effects

The fitting body of the fitting device of the present invention is connected to the base slidably through the return devices. When the alignment of the fitting body and the curved accommodating member has a deviation, since the position of the curved accommodating member is fixed, the curved accommodating member is pressed down, the curved accommodating member makes the fitting body slide on the base, and the return devices generate deformations, so as to adaptively adjust the deviation between the flexible member to be fitted on the fitting body and the curved accommodating member.

The support assembly is arranged in the fitting body of the present invention, and the support assembly includes the first support rods and the second support rods which are crossed with each other. When the curved accommodating member is pressed down, the first support rods and the second support rods generate pressure toward an arc of the curved accommodating member to increase the fitting degree between the flexible member to be fitted and the curved accommodating member, thereby improving the fitting yield.

The fitting shafts are provided in the fitting body of the present invention, which can reduce the deformation of the bearing platform when the flexible member to be fitted is pre-bent, improve the fitting degree between the flexible member to be fitted and the arc of the curved accommodating member, improve the evenness of the fitting pressure, and improve the fitting yield.

BRIEF DESCRIPTION OF DRAWINGS

To describe technical solutions in embodiments of this application more clearly, the following briefly introduces the accompanying drawings required for describing the embodiments. Apparently, the accompanying drawings in the following description show only some embodiments of this application, and a person skilled in the art may still derive other accompanying drawings from these accompanying drawings without creative efforts.

Figure 1:
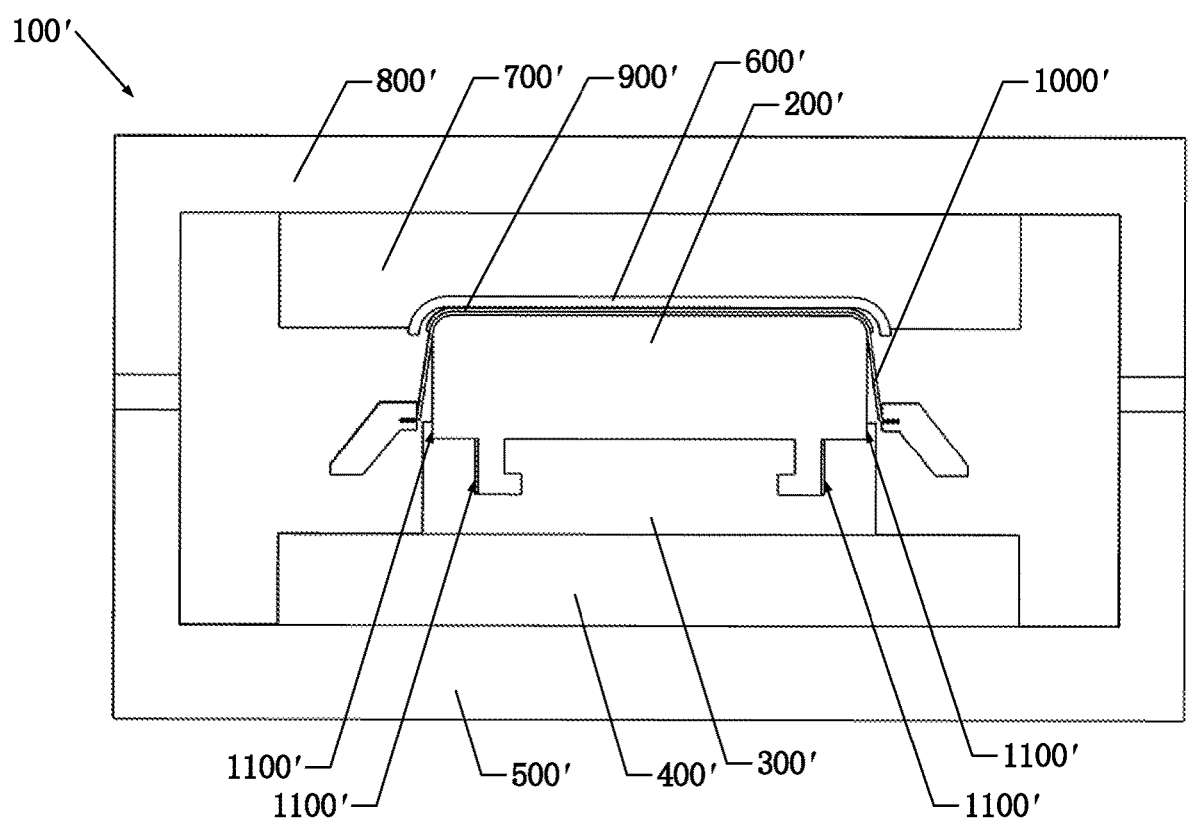
FIG. 1 is a schematic structural diagram of an existing fitting device.
Figure 2:
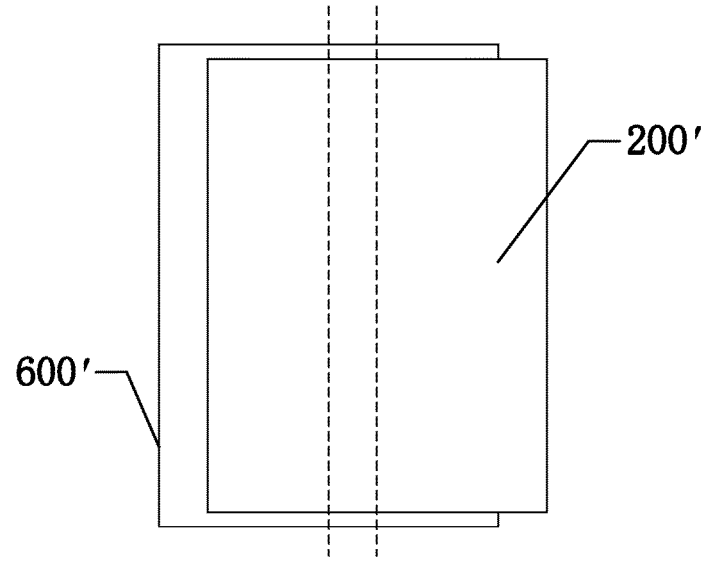
FIG. 2 is a schematic diagram showing that a central axis of a flexible pressing block in an existing fitting device is deflected to the right.
Figure 3:
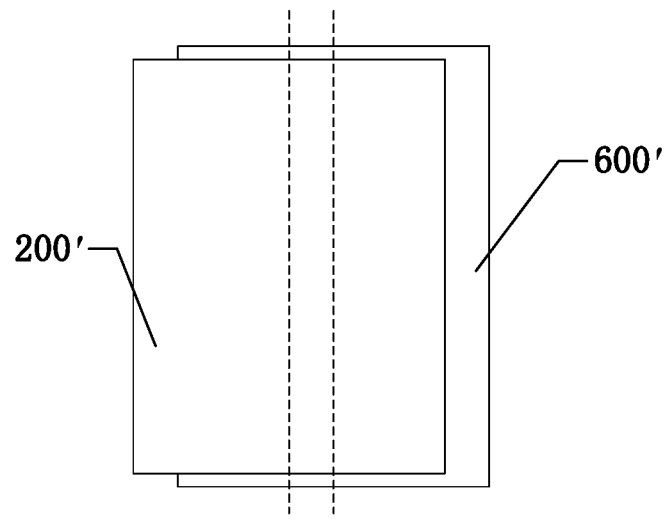
FIG. 3 is a schematic diagram showing that a central axis of a flexible pressing block in an existing fitting device is deflected to the left.
Figure 4:
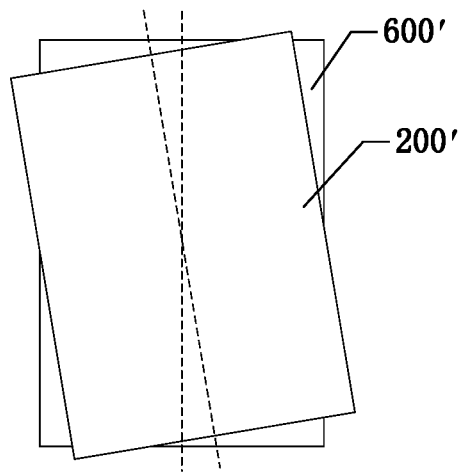
FIG. 4 is a schematic diagram showing that a central axis of a flexible pressing block in an existing fitting device is deflected counterclockwise.
Figure 5:
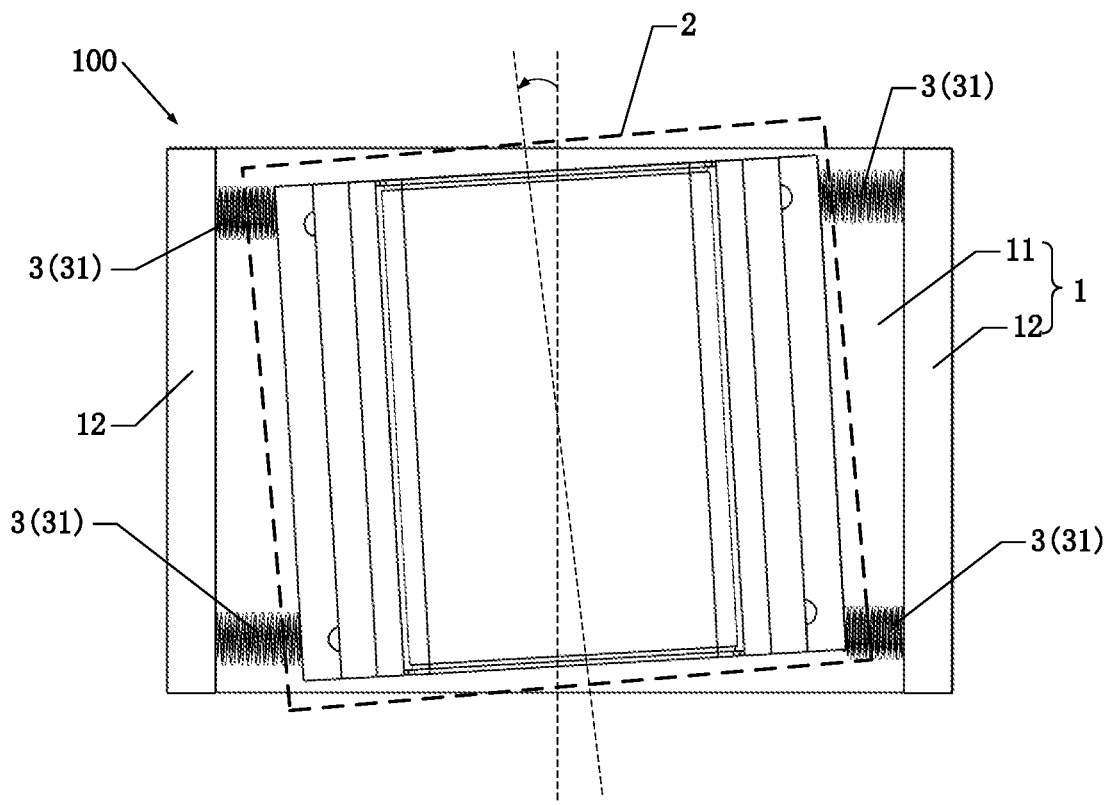
FIG. 5 is a schematic diagram I before a flexible member to be fitted on a fitting body of a fitting device is fitted with a curved accommodating member in an embodiment 1.
Figure 6:
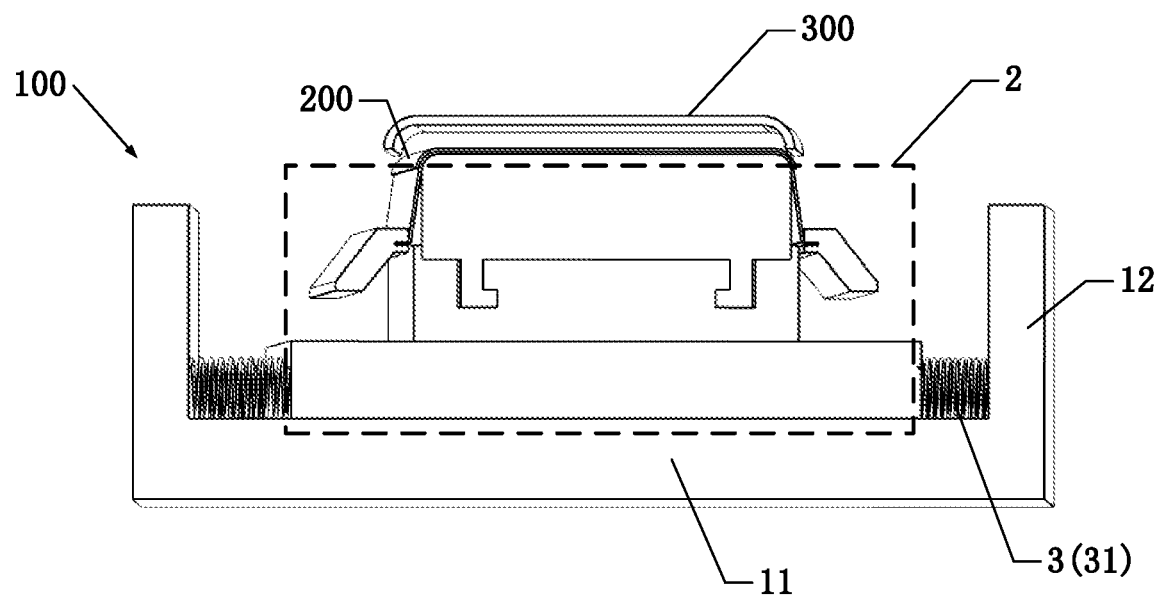
FIG. 6 is a schematic diagram II before a flexible member to be fitted on a fitting body of a fitting device is fitted with a curved accommodating member in an embodiment 1.
Figure 7:
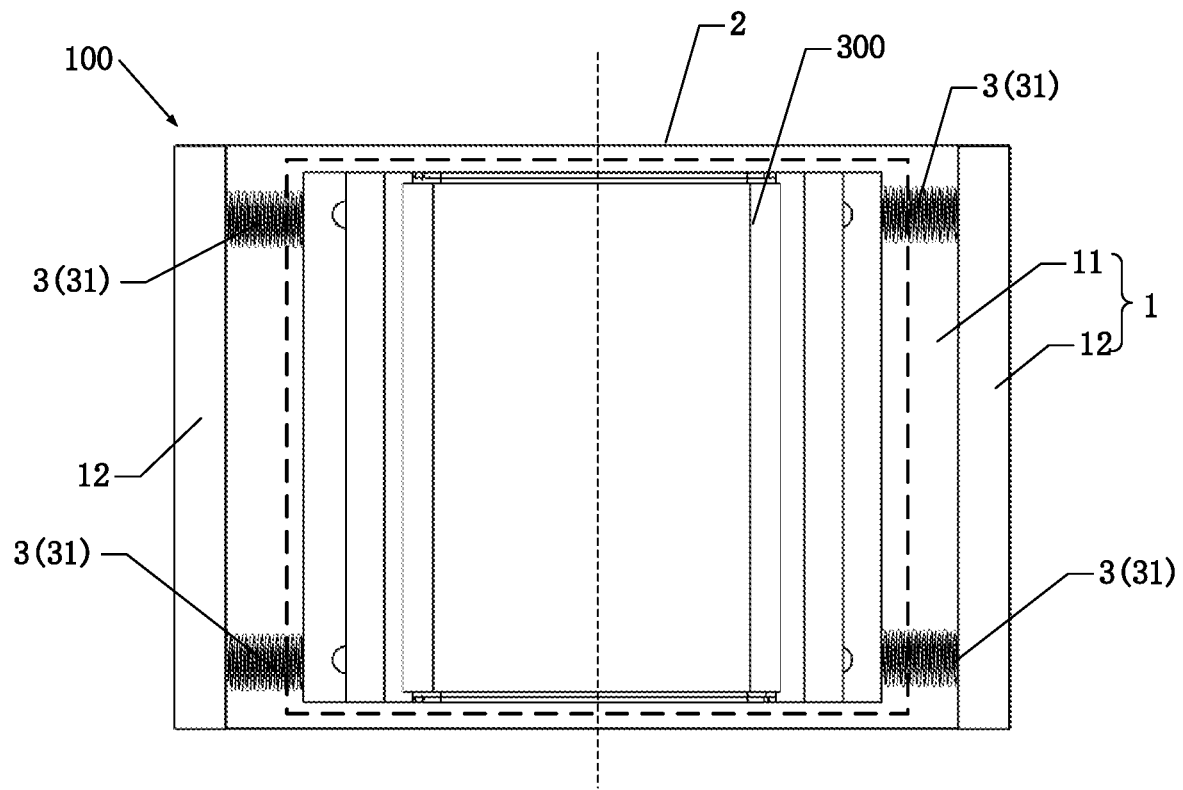
FIG. 7 is a schematic diagram I after a flexible member to be fitted on a fitting body of a fitting device is fitted with a curved accommodating member in an embodiment 1.
Figure 8:
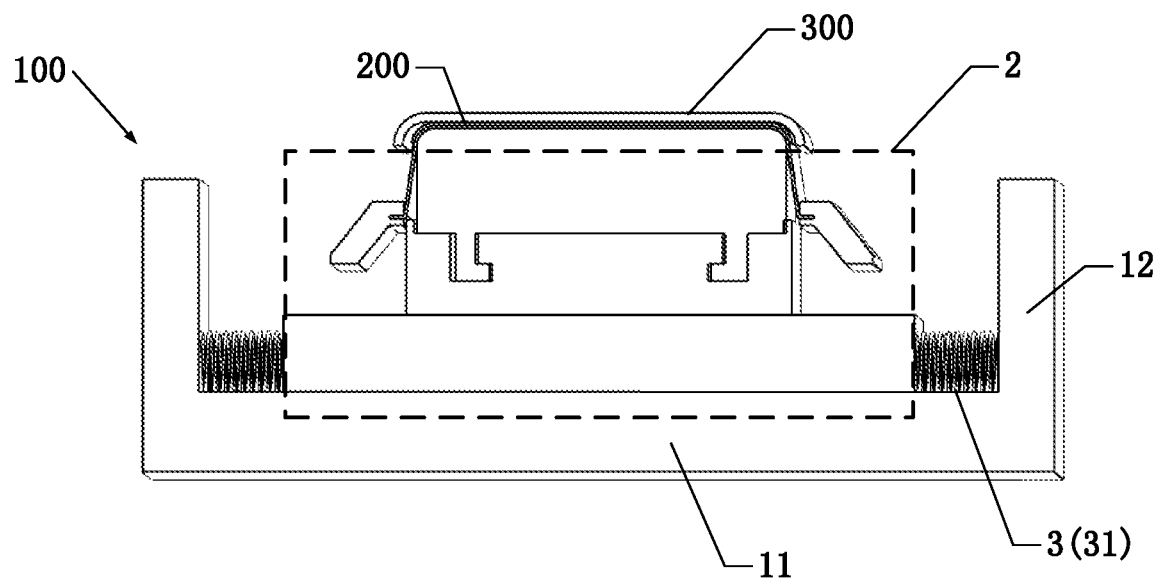
FIG. 8 is a schematic diagram II after a flexible member to be fitted on a fitting body of a fitting device is fitted with a curved accommodating member in an embodiment 1.

REFERENCE NUMERALS 100. fitting device; 200. flexible member to be fitted;
300. curved accommodating member;
1. base; 2. fitting body;
3. return device;
31. elastic element; 32. adjusting element;
21. support assembly; 22. bearing platform;
23. fitting shaft;
211. support shaft; 212. first support rod;
213. second support rod.

DETAILED DESCRIPTION OF PREFERRED EMBODIMENTS

The following describes the preferred embodiments of the present invention in detail with reference to the accompanying drawings of the specification, so as to fully introduce the technical content of the present invention to a person skilled in the art, so as to prove that the present invention can be implemented by examples, so that the technical content disclosed by the present invention becomes clearer and a person skilled in the art can understand easily how to implement the present invention. However, the present invention can be embodied in many different forms of embodiments, the protection scope of the present invention is not limited to the embodiments mentioned in the specification, and the description of the following embodiments is not intended to limit the scope of the present invention.

The directional terms mentioned in the present invention, for example, "upper", "lower", "before", "after", "left", "right", "inside", "outside", and "side", merely refer to directions in the accompanying drawings. The directional terms used herein are used to explain and describe the present invention, not to limit the protection scope of the present invention.

In the accompanying drawings, components with a same structure are denoted by a same numeral, and components with similar structures or functions are denoted by similar numerals. In addition, for ease of understanding and description, the size and thickness of each component shown in the accompanying drawings are arbitrarily shown, and the present invention does not limit the size and thickness of each component.

Embodiment 1

As shown in FIG. 5 to FIG. 8, this embodiment provides a fitting device 100 for fitting a flexible member 200 to be fitted and a curved accommodating member 300. In this embodiment, the flexible member 200 to be fitted is a flexible display panel, and the curved accommodating member 300 is a curved cover plate.

The fitting device 100 includes: a base 1, a fitting body 2 and at least two return devices 3.

The base 1 includes a bottom plate 11 and two side plates 12. The two side plates 12 protrude from two ends of the bottom plate 11 and are perpendicular to the bottom plate 11.

The fitting body 2 is connected to the base 1 slidably. Specifically, the fitting body can slide by virtue of the friction between the fitting body 2 and the base 1, or the fitting body 2 can slide relative to the base 1 by installing sliding mechanisms such as rollers on the fitting body 2.

One end of each of the return devices 3 is connected to the fitting body 2, and the other end is connected to the base 1. In this embodiment, two ends of each of the side plates 12 are respectively provided with a return device 3.

Each of the return devices 3 includes an elastic element 31. In this embodiment, the elastic element 31 is a spring.

As shown in FIG. 5 to FIG. 8, taking a counterclockwise deflection of the fitting body 2 relative to the curved accommodating member 300 as an example, first, the flexible member 200 to be fitted is pre-bent on the fitting body 2. When the curved accommodating member 300 is pressed down to fit the flexible member 200 to be fitted, the upper left corner and the lower right corner of the flexible member 200 to be fitted on the fitting body 2 first contact the curved accommodating member 300. Since the position of the curved accommodating member 300 is fixed and the fitting body 2 is connected to the base 1 slidably through the return devices 3, the fitting body 2 rotates clockwise under the action of the force of the curved accommodating member 300, and finally, the central axis of the fitting body 2 coincides with the central axis of the curved accommodating member 300, thereby improving the alignment accuracy of the flexible member 200 to be fitted on the fitting body 2 and the curved accommodating member 300, improving the fitting evenness of the flexible member 200 to be fitted and the curved accommodating member 300, and preventing the occurrence of bad phenomena such as breakage, bubbles and dark spots.

In conclusion, the fitting body 2 of the fitting device 100 in this embodiment is connected to the base 1 slidably through the return devices 3. When the alignment of the fitting body 2 and the curved accommodating member 300 has a deviation, since the position of the curved accommodating member 300 is fixed, the curved accommodating member 300 is pressed down, the curved accommodating member 300 makes the fitting body 2 slide on the base 1, and the return devices 3 generate deformations, so as to adaptively adjust the deviation between the fitting body 2 and the curved accommodating member 300, thereby improving the alignment accuracy between the fitting body 2 and the curved accommodating member 300.

Embodiment 2

Figure 9:
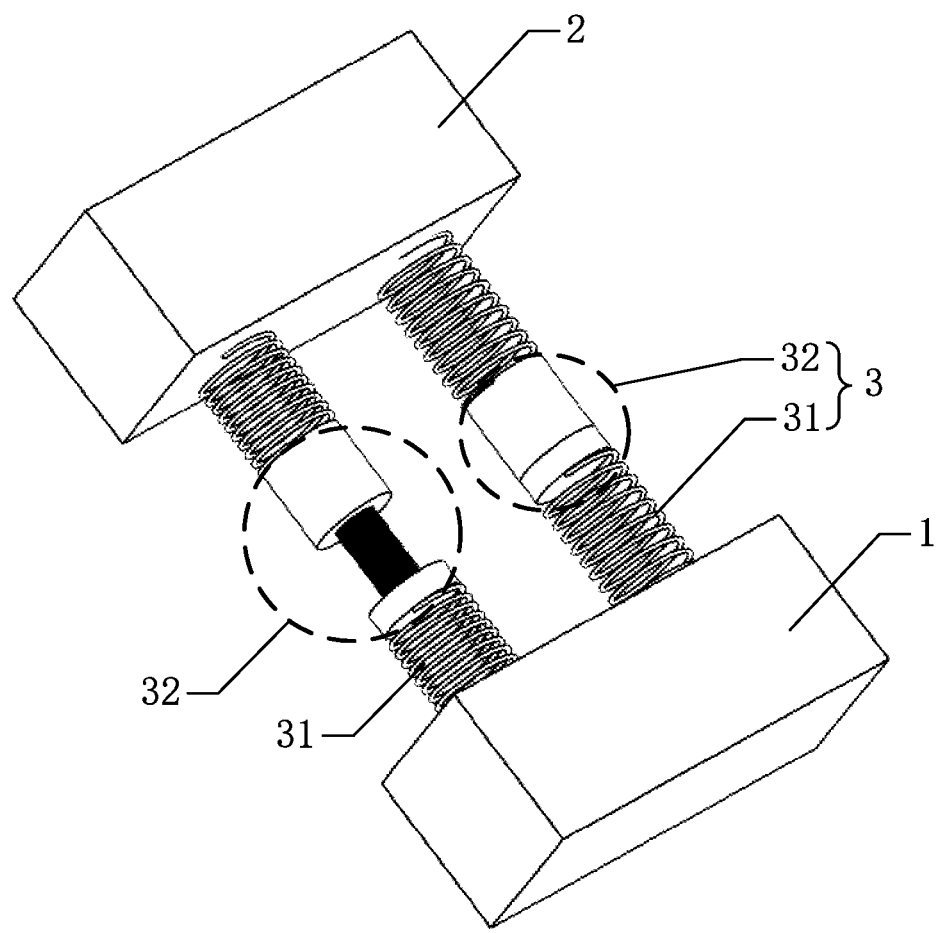
FIG. 9 is a schematic structural diagram of return devices in an embodiment 2.

As shown in FIG. 9, this embodiment includes most of the technical features of Embodiment 1. The differences between this embodiment and Embodiment 1 are: each of the return devices 3 in this embodiment further includes an adjusting element 32, and the adjusting element 32 is connected to the elastic element 31.

The adjusting element 32 may be arranged in the middle of the elastic element 31, or may be arranged between the elastic element 31 and the fitting body 2, or may be arranged between the elastic element 31 and the base 1. In this embodiment, the adjusting element 32 is arranged in the middle of the elastic element 31. The adjusting element 32 is mainly used to adjust the tightness of the elastic element 31.

After the curved accommodating member 300 is fitted to the flexible member 200 to be fitted on the fitting body 2, the tightness of the elastic elements 31 of the return devices 3 is adjusted by the adjusting elements 32, such that after the fitted curved accommodating member 300 is removed, the fitting body 2 is kept immobile to avoid multiple frictions of the fitting body 2 to prolong the service life of the fitting body 2.

Embodiment 3

Figure 10:
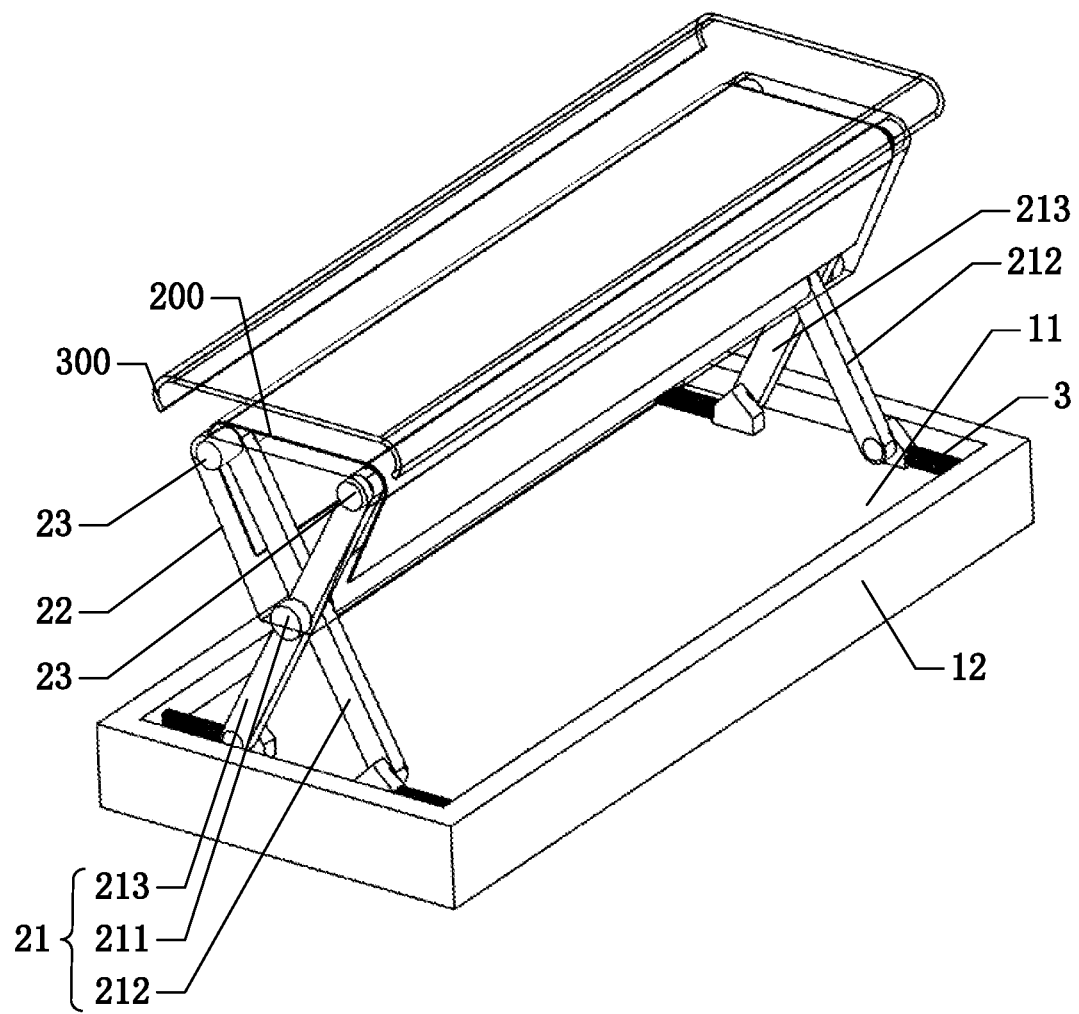
FIG. 10 is a schematic diagram I before a flexible member to be fitted on a fitting body of a fitting device is fitted with a curved accommodating member in an embodiment 3.
Figure 11:
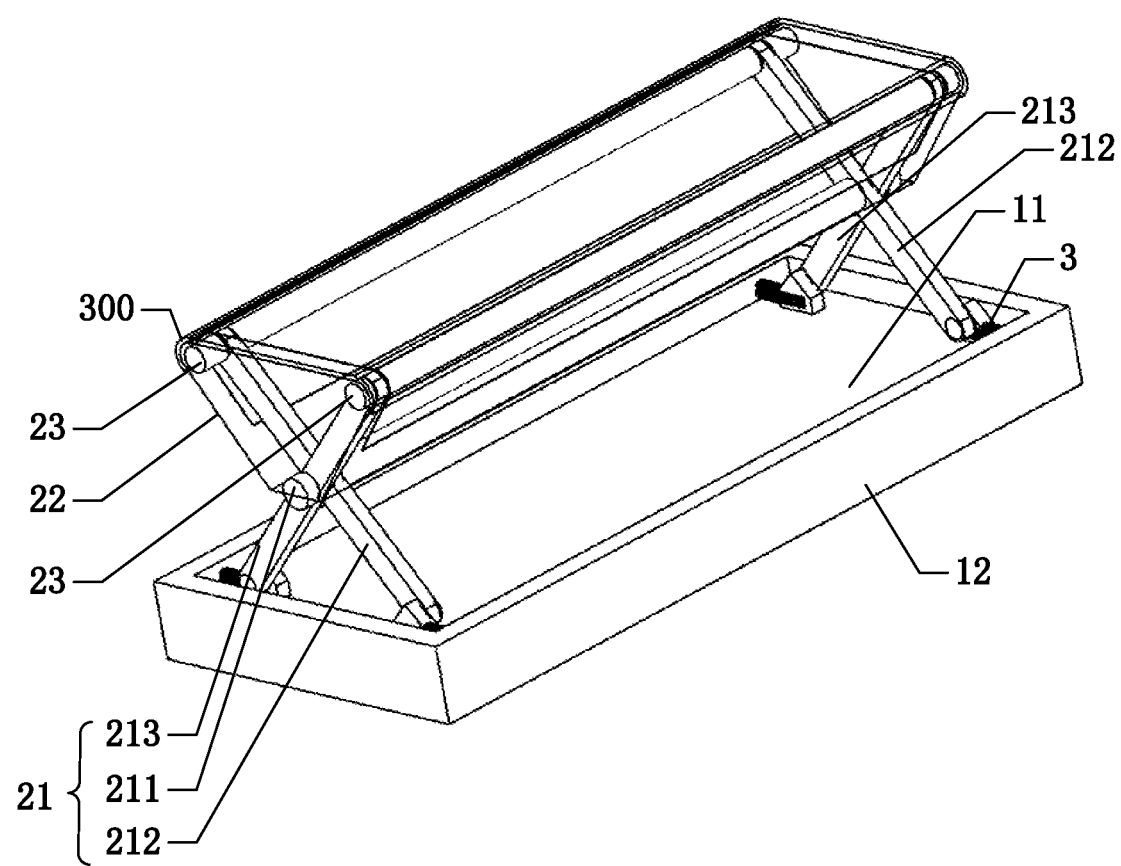
FIG. 11 is a schematic diagram I after a flexible member to be fitted on a fitting body of a fitting device is fitted with a curved accommodating member in an embodiment 3.

As shown in FIG. 10 and FIG. 11, this embodiment includes most of the technical features of Embodiment 1. The differences between this embodiment and Embodiment 1 are: a fitting body 2 in this embodiment includes: a support assembly 21, a bearing platform 22 and two fitting shafts 23.

The support assembly 21 is connected to the base 1 slidably. The support assembly 21 includes: a support shaft 211, two first support rods 212 and two second support rods 213.

The two first support rods 212 are parallel to each other and are connected to two ends of the support shaft 211 rotationably.

The two second support rods 213 are parallel to each other, are connected to two ends of the support shaft 211 rotationably, and are crossed with the first support rods 212.

One end of each of the first support rods 212 close to the base 1 is connected with a return device 3, and one end of each of the second support rods 213 close to the base 1 is connected with a return device 3.

One first support rod 212 is crossed with one second support rod 213, and an intersection point of the first support rod 212 and the support shaft 211, an intersection point of the second support rod 213 and the support shaft 211 and an intersection point of the first support rod 212 and the second support rod 213 coincide with each other.

Figure 12:
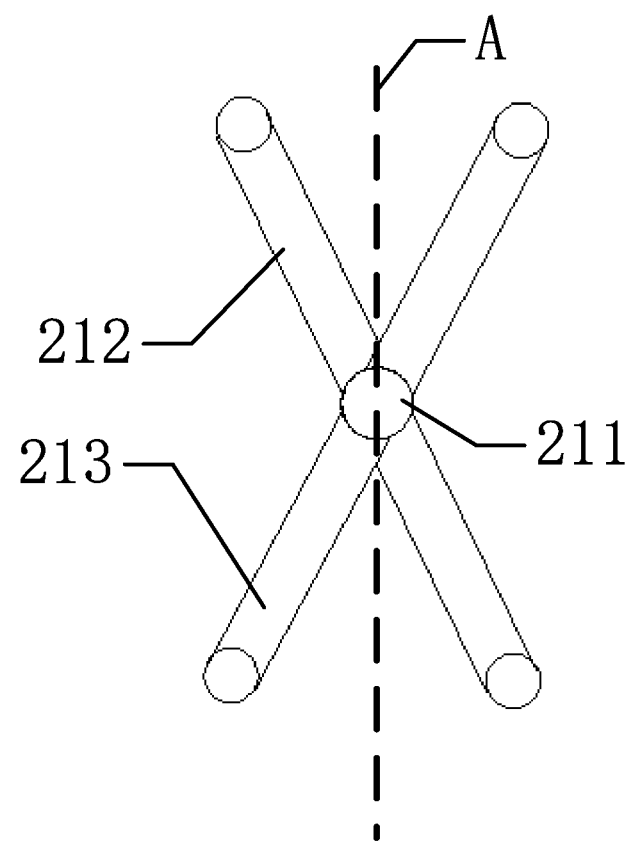
FIG. 12 is a schematic diagram of a side surface of a support assembly.

As shown in FIG. 12, the first support rod 212 and the second support rod 213 located on the support shaft 211 at the same end are symmetrical with respect to an axis A. As a result, an upper surface of the bearing platform 22 can be in a plane, which is more conducive to the fitting of the flexible member 200 to be fitted and the curved accommodating member 300 by taking a symmetrical axis of the first support rod 212 and the second support rod 213 on the bearing platform 22 as the support shaft 211.

The support assembly 21 is arranged in the fitting body 2 in this embodiment, and the support assembly 21 includes the first support rods 212 and the second support rods 213 which are crossed. When the curved accommodating member 300 is pressed down, the first support rods 212 and the second support rods 213 are opened by sliding in the base 1 through the return devices 3 to generate pressure toward an arc of the curved accommodating member 300, thereby increasing the fitting degree between the flexible member 200 to be fitted and the curved accommodating member 300, and improving the fitting yield.

The two fitting shafts 23 are parallel to each other and are parallel to the support shaft 211. The two fitting shafts 23 are connected between the two first support rods 212 and between the two second support rods 213 respectively. That is, one of the fitting shafts 23 is connected between the two first support rods 212, and the other one of the fitting shafts 23 is connected between the two second support rods 213.

The fitting shafts 23 are provided in the fitting body 2 in this embodiment, which can reduce the deformation of the bearing platform 22 when the flexible member 200 to be fitted is pre-bent, improve the fitting degree between the flexible member 200 to be fitted and the arc of the curved accommodating member 300, improve the evenness of the fitting pressure, and improve the fitting yield.

The bearing platform 22 is connected to one end of the support assembly 21 away from the base 1. The material of the bearing platform 22 is silica gel.

The cross-sectional shape of the bearing platform 22 on a surface perpendicular to the fitting shaft 23 is a rounded trapezoid, and the length of a bottom edge of the rounded trapezoid on one side close to the base 1 is smaller than the length of a bottom edge on one side away from the base 1, thereby being more conducive to fitting of the curved accommodating member 300 of which the arc angle is greater than 90°, and more specifically suitable for fitting of the curved accommodating member 300 of which the arc angle is 30°-150°. The arc angle herein refers to an included angle between two end points of the arc and a line connecting the center of the circle where the arc is located.

Further, the above describes the fitting device provided in this application in detail. Although the principles and implementations of this application are described by using specific examples in this specification, the descriptions of the foregoing embodiments are merely intended to help understand the method and the core idea of the method of this application. Meanwhile, a person of ordinary skill in the art may make modifications to the specific implementations and application range according to the idea of this application. In conclusion, the content of this specification is not construed as a limit on this application.

What is claimed is:

1. A fitting device for fitting a flexible member to be fitted and a curved accommodating member, comprising:
a base;
a fitting body slidably connected to the base; and at least two return devices, wherein one end of each of the return devices is connected to the fitting body, and the other end is connected to the base;

wherein the fitting body comprises a support assembly connected to the base slidably; and the support assembly comprises:
- a support shaft;
- two first support rods parallel to each other and connected to two ends of the support shaft rotationably; and
- two second support rods parallel to each other, connected to two ends of the support shaft rotationably, and crossed with the first support rods.

2. The fitting device according to claim 1, wherein each of the return devices comprises an elastic element.

3. The fitting device according to claim 2, wherein each of the return devices further comprises an adjusting element, and the adjusting element is connected to the elastic element.

4. The fitting device according to claim 1, wherein the fitting body further comprises:
a bearing platform connected to one end of the support assembly away from the base.

5. The fitting device according to claim 4, wherein a cross-sectional shape of the bearing platform is a rounded trapezoid, and a length of a bottom edge of the rounded trapezoid on one side close to the base is less than the length of a bottom edge on one side away from the base.

6. The fitting device according to claim 1, wherein the first support rod and the second support rod located at the same end of the support shaft are symmetrical to each other.

7. The fitting device according to claim 1, wherein the fitting body further comprises:
two fitting shafts parallel to each other and connected between the two first support rods and between the two second support rods respectively.

8. The fitting device according to claim 7, wherein the fitting shafts are parallel to the support shaft.

9. The fitting device according to claim 1, wherein the flexible member to be fitted is a flexible display panel, and the curved accommodating member is a curved cover plate.

* * * * *